United States Patent
Park et al.

(10) Patent No.: US 8,847,917 B2
(45) Date of Patent: *Sep. 30, 2014

(54) LIQUID CRYSTAL DISPLAY HAVING A BUILT-IN TOUCH SCREEN USING CAPACITANCE AND SENSE LINES FOR DETECTING A TOUCH POSITION

(75) Inventors: Jin-Woo Park, Yongin (KR); Sang-Uk Kim, Yongin (KR); Hee-Chul Hwang, Yongin (KR); Mu-Kyung Jeon, Yongin (KR); Hideo Yoshimura, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 532 days.

This patent is subject to a terminal disclaimer.

(21) Appl. No.: 12/834,157

(22) Filed: Jul. 12, 2010

(65) Prior Publication Data

US 2011/0080358 A1 Apr. 7, 2011

(30) Foreign Application Priority Data

Oct. 6, 2009 (KR) ........................ 10-2009-0094560

(51) Int. Cl.
*G06F 3/042* (2006.01)
*G06F 3/044* (2006.01)
*G06F 3/041* (2006.01)

(52) U.S. Cl.
CPC .............. *G06F 3/0412* (2013.01); *G06F 3/044* (2013.01)
USPC ........................................................ 345/175

(58) Field of Classification Search
USPC ............................................... 345/173–175
See application file for complete search history.

(56) References Cited

U.S. PATENT DOCUMENTS

| 7,773,068 B2 | 8/2010 | Nakamura et al. |
| 2006/0017710 A1 | 1/2006 | Lee et al. |

(Continued)

FOREIGN PATENT DOCUMENTS

| JP | 2004-534974 | 11/2004 |
| JP | 2006-40289 | 2/2006 |

(Continued)

OTHER PUBLICATIONS

KIPO Office action dated Jan. 19, 2011, for Korean priority Patent application 10-2009-0094560, noting listed references in this IDS.

(Continued)

*Primary Examiner* — Long D Pham
(74) *Attorney, Agent, or Firm* — Christie, Parker & Hale, LLP

(57) ABSTRACT

A liquid crystal display (LCD) with a built-in touch screen includes: a first substrate including a sensor area having a plurality of photosensors; a second substrate positioned over the first substrate, and including a color filter, a light receiving portion, and a transparent electrode layer and a front polarizing plate; an LCD panel including a liquid crystal layer interposed between the first and second substrates; a touch screen driver circuit to measure a capacitance variation sensed through a first sensing line connected to the transparent electrode layer and to calculate a touch area using optical information sensed through a second sensing line connected to the photosensors when a contact object is in contact with the LCD panel, and to output position information of the contact object, sensed by determining whether a touch occurs and whether a multi-touch occurs using the capacitance variation and the touch area.

26 Claims, 2 Drawing Sheets

(56) References Cited

U.S. PATENT DOCUMENTS

| | | |
|---|---|---|
| 2006/0053387 A1 | 3/2006 | Ording |
| 2008/0018612 A1* | 1/2008 | Nakamura et al. ............ 345/173 |
| 2008/0122803 A1* | 5/2008 | Izadi et al. .................... 345/175 |
| 2009/0015555 A1 | 1/2009 | Takashima et al. |
| 2009/0122007 A1 | 5/2009 | Tsuzaki et al. |
| 2009/0289910 A1* | 11/2009 | Hattori .......................... 345/173 |
| 2009/0315840 A1* | 12/2009 | Park et al. ..................... 345/173 |
| 2010/0123678 A1 | 5/2010 | Kim et al. |
| 2010/0182273 A1 | 7/2010 | Noguchi et al. |
| 2011/0080357 A1* | 4/2011 | Park et al. ..................... 345/173 |

FOREIGN PATENT DOCUMENTS

| | | |
|---|---|---|
| JP | 2008-27292 | 2/2008 |
| JP | 2009-20759 | 1/2009 |
| JP | 2009-64074 | 3/2009 |
| JP | 2009-116769 A | 5/2009 |
| JP | 2010-152671 | 7/2010 |
| KR | 10-2004-0077269 | 9/2004 |
| KR | 10-2006-0009602 | 2/2006 |
| KR | 10-2007-0082750 | 8/2007 |
| KR | 10-2008-0044017 | 5/2008 |
| KR | 10-0833621 | 5/2008 |
| KR | 10-2009-0095890 | 9/2009 |
| WO | WO 02/35460 A1 | 5/2002 |
| WO | WO 2009/119664 A1 | 10/2009 |

OTHER PUBLICATIONS

Japanese Office Action dated Aug. 7, 2012, issued in Japanese Application No. 2010-092518, 2 pages.

KIPO Office action dated Sep. 30, 2011, for Korean priority Patent application 10-2009-0094560, 1 page.

KIPO Office action dated Sep. 20, 2011 for Korean Patent application 10-2009-0094559, (1 page).

JPO Office action dated Aug. 7, 2012 for Japanese Patent application 2010-093029, (2 pages).

U.S. Office action dated Jun. 6, 2013, for cross reference U.S. Appl. No. 12/834,102, (18 pages).

* cited by examiner

LIQUID CRYSTAL DISPLAY HAVING A BUILT-IN TOUCH SCREEN USING CAPACITANCE AND SENSE LINES FOR DETECTING A TOUCH POSITION

CROSS-REFERENCE TO RELATED APPLICATION

This application claims the benefit of Korean Patent Application No. 10-2009-0094560, filed Oct. 6, 2009, in the Korean Intellectual Property Office, the disclosure of which is incorporated herein by reference.

BACKGROUND OF THE INVENTION

1. Field of the Invention

Aspects of the present invention relate to a liquid crystal display (LCD) with a built-in touch screen, and more particularly, to an LCD with a built-in touch screen of a photosensor type, which has an operational reliability improved by combining a capacitance type with the photosensor type.

2. Description of the Related Art

A touch screen is provided on a front face of an image display device so that a user can select an instruction content displayed on a screen of the image display device using a user's hand or an object. The touch screen is in direct contact with the user's hand or the object. The touch screen senses a contact position, and the image display device receives a content instructed at the contact position as an input signal so as to be driven based on the input signal.

An image display device having a touch screen does not require a separate input device (such as a keyboard or mouse) connected to the image display device to operate. Hence, its application fields have been gradually extended. Recently, touch screens have been widely used in liquid crystal displays (LCDs). An LCD having a touch screen includes an LCD panel to display images and a touch screen panel positioned over the LCD panel to sense position information through a touch input from a user. At this time, a frame or adhesive is used to allow the touch screen panel to be positioned over the LCD panel, in which an air layer is formed between the LCD panel and the touch screen panel. In this case, a layer having a different refractive index from those of the LCD panel and the touch screen panel is formed between the LCD panel and the touch screen panel, and therefore, the optical characteristic of the entire LCD is deteriorated. Furthermore, since a separate touch screen panel is manufactured and then attached to the LCD panel, manufacturing cost is raised, and the thickness of the LCD is increased. Therefore, to solve such problems, an LCD with a built-in touch screen implemented by integrating a touch screen panel and an LCD panel is required.

Meanwhile, a photosensor or the like may be used to sense position information through a touch input from a user. In this case, a touch position is sensed by distinguish a portion covered by a contact object (such as a finger or touch stick) from a portion onto which external light is incident through the photosensor.

However, in the case of the touch screen of a photosensor type, if the illuminance of external light is low, a difference in illuminance between a portion onto which the external light is incident through a photosensor and a portion covered by a contact object is slight when a touch occurs. Therefore, the recognition rate of the touch may be lowered. On the other hand, if the illuminance of the external light is high, the portion onto which the external light is incident and the portion covered by the contact object are almost recognized as black and white when the touch occurs. Hence, the photosensor may erroneously recognize a shadow as a touch even when a user's finger or object is not touching a touch screen panel, but is located over the touch screen panel. Therefore, operational reliability may be lowered. Moreover, if the illumination of the external light is high, the photosensor may recognize a shadow as a multi-touch even when a multi-touch does not occur. For example, when the touch screen panel is touched by one finger and another finger is located over the touch screen panel, the photosensor may erroneously determine that the touch screen panel is touched by both of the fingers, and therefore, may be erroneously recognize a multi-touch.

Accordingly, there is a need to secure the operational reliability of the touch screen by precisely recognizing a touch event.

SUMMARY OF THE INVENTION

Aspects of the present invention provide a liquid crystal display (LCD) with a built-in touch screen of a photosensor type, which has photosensors provided in an LCD panel and has an operational reliability improved by combining a capacitance type with the photosensor type.

According to an aspect of the present invention, there is provided an LCD with a built-in touch screen, the LCD including: a first substrate including a pixel area having a plurality of pixels to display images, and a sensor area adjacent to the pixel area and having a plurality of photosensors to sense a position of a contact object; a second substrate positioned over the first substrate, the second substrate including a color filter in an area corresponding to the pixel area on a first surface of the second substrate facing the first substrate, a light receiving portion, onto which external light is incident, in an area of the first surface corresponding to the sensor area, and a transparent electrode layer and a front polarizing plate sequentially stacked on a second surface of the second substrate opposite to the first surface; an LCD panel including a liquid crystal layer interposed between the first and second substrates; and a touch screen driver circuit to measure a capacitance variation sensed through a first sensing line connected to the transparent electrode layer and to calculate a touch area using optical information sensed through a second sensing line connected to the plurality of photosensors when the contact object is in contact with the LCD panel, and to output position information of the contact object, sensed by determining whether a touch of the contact object on the LCD panel occurs and whether a multi-touch occurs using the measured capacitance variation and the calculated touch area.

When the capacitance variation is greater than or equal to a predetermined threshold value, the touch screen driver circuit may output the position information of the contact object, sensed using the optical information.

When the capacitance variation is within a multi-touch range while being greater than or equal to the predetermined threshold value and the touch area sensed using the optical information includes a plurality of touch points, the touch screen driver circuit may output the position information of the object by selecting only some of the sensed touch points.

The touch screen driver circuit may select some of the plurality of touch points sensed using the optical information based on the touch area and/or a light quantity variation.

The touch screen driver circuit may include a capacitance measurer to measure the capacitance variation provided through the first sensing line; a touch area calculator to calculate the touch area sensed using the optical information provided through the second sensing line; a controller to control a control signal to be output by determining whether the touch occurs and whether the multi-touch occurs using the capacitance variation and the touch area; and a position sensor to output the position information of the object according to the control signal.

When the measured capacitance variation is less than a multi-touch range and greater than or equal to the predetermined threshold value and the touch sensed using the optical information includes a plurality of touch points, the controller may determine the touch as a single touch and accordingly output the control signal.

The position sensor may output the position information as a single point in response to the control signal.

The LCD may further include a backlight assembly positioned below the LCD panel to provide light to the LCD panel, and a light shielding layer to prevent the provided light from being incident directly onto the plurality of photosensors may be provided on a surface of the first substrate corresponding to the sensor area.

According to another aspect of the present invention, there is provided a liquid crystal display (LCD) with a built-in touch screen, the LCD including: a first substrate including a pixel area having a plurality of pixels to display an image, and a sensor area adjacent to the pixel area and having a plurality of photosensors to sense a position of a contact object; a second substrate positioned over the first substrate, the second substrate including a transparent electrode layer; an LCD panel including a liquid crystal layer interposed between the first and second substrates; and a touch screen driver circuit to measure a capacitance variation sensed through a first sensing line connected to the transparent electrode layer and to calculate a touch area using optical information sensed through a second sensing line connected to the plurality of photosensors when the contact object is in contact with the LCD panel, and to output position information of the contact object, sensed by determining whether a touch of the contact object on the LCD panel occurs and whether a multi-touch occurs using the measured capacitance variation and the calculated touch area.

According to still another aspect of the present invention, there is provided a touch screen driver circuit of a liquid crystal display (LCD) with an LCD panel, a plurality of photosensors on a first substrate to sense a position of a contact object in contact with the LCD panel, and a transparent electrode layer on a second substrate, the touch screen driver circuit including: a capacitance measurer to measure a capacitance variation provided through a first sensing line connected to the transparent electrode layer; a touch area calculator to calculate a touch area using optical information provided through a second sensing line connected to the plurality of photosensors when the contact object is in contact with the LCD panel; a controller to control a control signal to be output by determining whether a touch occurs and whether a multi-touch occurs using the measured capacitance variation and the calculated touch area; and a position sensor to output position information of the contact object according to the control signal received from the controller.

According to aspects of the present invention, an LCD with a built-in touch screen of a photosensor type is implemented by forming photosensors on a lower substrate of an LCD panel, thereby improving optical characteristics of the LCD, improving a manufacturing cost, and providing a thin LCD. Furthermore, it is precisely determined whether a touch occurs and whether a multi-touch occurs through a capacitance type using a transparent electrode layer formed on a front face of the LCD panel, thereby improving an operational reliability of the LCD with the built-in touch screen.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
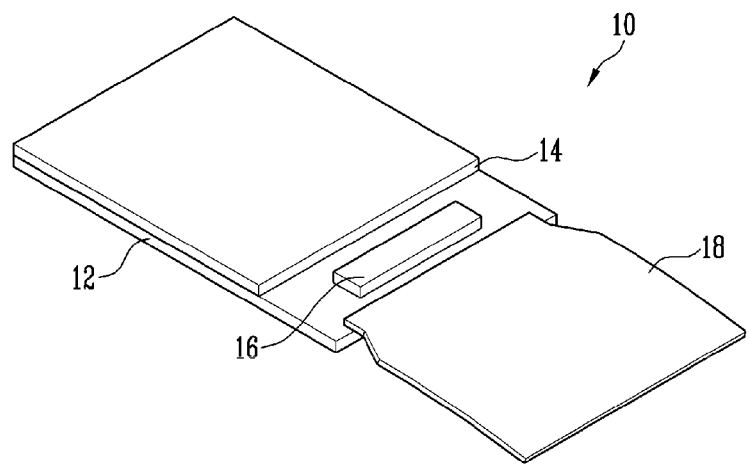
FIG. 1 is a perspective view of a liquid crystal display (LCD) panel according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a perspective view of a liquid crystal display (LCD) panel 10 according to an embodiment of the present invention. Referring to FIG. 1, the LCD panel 10 includes a first substrate 12 having pixel electrodes, thin film transistors (TFTs), and the like formed thereon, a second substrate 14 having color filters and the like formed thereon, and a liquid crystal layer (not shown) interposed between the first and second substrates 12 and 14. Here, the first substrate 12 has a larger area than that of the second substrate 14. A driver integrated circuit (IC) 16 to drive the TFTs and the like is formed on a non-pixel region of the first substrate 12, which is not covered by the second substrate 14. A flexible printed circuit board (FPCB) 18 connected to the driver IC 16 is formed at one end portion of the non-pixel region on which the driver IC 16 is formed.

In the shown embodiment, photosensors are built in the LCD panel 10. That is, the LCD panel 10 is integrally formed with a touch screen of a photosensor type, of which a detailed description will be described later with reference to FIG. 2.

Figure 2:
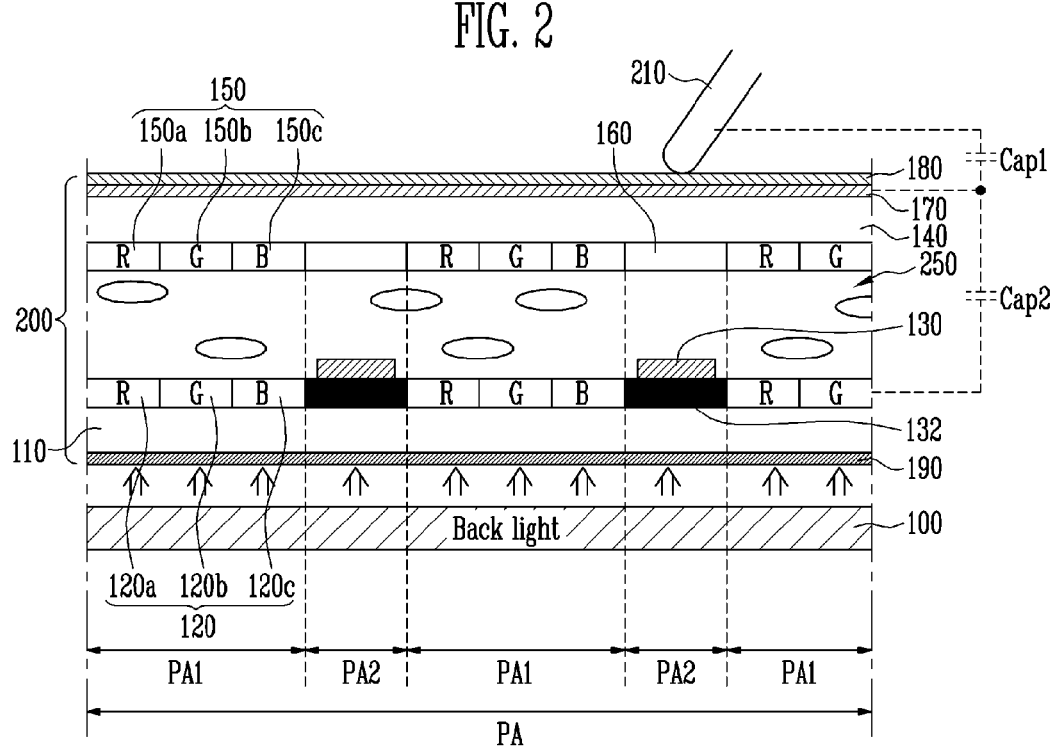
FIG. 2 is a sectional view illustrating a main section of an LCD with a built-in touch screen according to an embodiment of the present invention.

FIG. 2 is a sectional view illustrating a main section of an LCD with a built-in touch screen according to an embodiment of the present invention. Referring to FIG. 2, the LCD with the built-in touch screen includes an LCD panel 200 to sense a position of an object 210 in contact therewith while displaying an image, and a backlight assembly 100 to supply light to the LCD panel 200.

The LCD panel 200 includes a first substrate 110 formed at the side of the back light assembly 100, a second substrate 140 provided over the first substrate 110 to be opposite to the first substrate 110, and a liquid crystal layer 250 interposed between the first and second substrates 110 and 140. Although not illustrated in FIG. 2, a pair of alignment layers to align liquid crystal molecules in the liquid crystal layer 250 are formed between the two substrates 110 and 140. Furthermore, a front polarizing plate 180 and a rear polarizing plate 190 are positioned opposite to each other at both sides of the LCD panel 200.

Particularly, in the shown embodiment, a plurality of photosensors 130 to sense a position of an object 210 (such as a finger or a touch stick) in contact with the LCD panel 200 are formed on the upper surface of the first substrate 110 opposite to the liquid crystal layer 250. The photosensors 130 are formed to provide a touch screen operation in the LCD panel 200, and may be regularly disposed on a display area PA of the first substrate 110.

FIG. 2 illustrates a section of the LCD panel 200 in which the photosensors 130 in the display area PA are regularly disposed in a matrix form. At this time, portions of the display area PA in which the photosensors 130 are formed are referred to as sensor areas PA2, and the other portions of the display area PA in which pixels 120 are formed are referred to as pixel areas PA1.

The pixel area PA1 includes a plurality of pixels to display an image. Here, the pixels are arranged in pixel units 120 that each include a red R pixel 120a, a green G pixel 120b, and a blue B pixel 120c. The classification of such colors is determined by a transparent wavelength characteristic of a color filter opposite to each of the pixels. That is, R, G and B color filters 150a, 150b and 150c respectively corresponding to R, G and B are formed on areas of the second substrate 140, respectively corresponding to the R, G and B pixels 120a, 120b and 120c formed on the first substrate 110.

Meanwhile, although not illustrated in FIG. 2, a pixel electrode and a common electrode are formed in the pixel area PA1. The pixel and common electrodes are formed of a transparent electrode material. Depending on the pixel configuration, an auxiliary capacitor, a switching element, and the like are formed in each of the pixels 120a, 120b and 120c. Here, the auxiliary capacitor auxiliarily supplies liquid crystal capacitance between the pixel and common electrodes, and the switching element controls a potential applied to the pixel electrode depending on the potential of an inputted image signal.

The photosensors 130 regularly disposed between the pixel areas PA1 are formed in the sensor areas PA2. For example, the photosensors 130 may be regularly formed on the first substrate 110 between the pixel areas PA1. The photosensors 130 are formed adjacent to the pixel areas PA1 to sense the position of an object 210 in contact with the LCD panel 200. When the ratio of a photosensor 130 to a pixel unit 120 having a plurality of pixels 120a, 120b and 120c respectively corresponding to R, G and B is 1:1, the arrangement density of the photosensors 130 is the maximum. However, it is understood that aspects of the present invention are not limited thereto. That is, the arrangement density of the photosensors 130 may be less than the maximum.

Meanwhile, the back light assembly 100 is positioned at the rear side of the first substrate 110. The back light assembly 100 is positioned opposite to the rear face of the LCD panel 200 to emit light into the display area PA of the LCD panel 200. Here, the light emitted from the back light assembly 100 is transmitted to the pixel areas of the first substrate 110 and the color filters 150 of the second substrate 140 and then displayed on a screen.

A light shielding layer 132 is located beneath each of the sensor areas PA2 on the first substrate 110 so as to prevent light emitted from the back light assembly 100 from being directly incident onto the photosensors 130.

A color filter 150 is located in a region corresponding to each of the pixel areas PA1 on a surface (first face) of the second substrate 140 opposite to the first substrate 110. A light receiving portion 160 onto which external light is incident is formed in a region corresponding to each of the sensor areas PA2 on the same face. Here, the light receiving portion 160 may be implemented as an opening, though aspects of the present invention are not limited thereto. For example, the light receiving portion 160 may be implemented as transmissive film between the color filters 150. External light is incident onto the photosensor 130 through the light receiving portion 160. When external light is covered by the touch object 210, the touch and position of the object 210 is sensed by a difference between light quantities sensed by the photosensor 130.

A transparent electrode layer 170 and a front polarizing plate 180 are sequentially stacked on a second surface (i.e., an upper surface), opposite to the first face of the second substrate 140. The transparent electrode layer 170 is not connected to a ground power source, but is connected to a touch screen driver circuit through a sensing line (not shown), so that a touch generated by the object 210 is provided to the touch screen driver circuit.

Aspects of the present invention may be usefully applied to an in-plane switching mode LCD in which a transparent ground electrode to prevent electrostatic discharge (ESD) is formed at a front face of the LCD panel 200. However, it is understood that aspects of the present invention are not limited thereto. Unlike the general in-plane switching mode LCD, aspects of the present invention may be applied to an LCD of a capacitance type, which can precisely determine whether a touch occurs without using the transparent electrode layer 170 as a ground electrode. More specifically, when a touch is generated by the touch object 210, the first capacitance of a first capacitor Cap1 and the second capacitance of a second capacitor Cap2 are varied. Here, the first capacitance of the first capacitor Cap1 is formed between the touch object 210 and the transparent electrode layer 170, and the second capacitance of the second capacitor Cap2 is formed between the transparent electrode layer 170 and the first substrate 110 (e.g., between the transparent electrode layer 170 and a TFT of each of the pixels 120a, 120b and 120c). In this case, the total variation of the first and second capacitances is sensed through a first sensing line connected to the transparent electrode layer 170. If the sensed total variation is greater than or equal to a threshold value, it is determined that a touch occurs. When it is determined that the touch occurs, the position information of the sensed object is output using optical information sensed by the photosensors 130.

According to aspects of the present invention, it is precisely determined whether a multi-touch occurs by calculating a touch area through the optical information Sphoto sensed by the photosensors 130 and comparing the touch area with the capacitance variation. That is, according to aspects of the present invention, it can be precisely determined whether a touch occurs and whether a multi-touch occurs using the entire screen like one button. Here, the threshold value to determine whether a touch occurs may be experimentally determined based on the capacitance variation when the touch occurs.

As described above, according to aspects of the present invention, the LCD with the built-in touch screen of the photosensor type is implemented by forming the photosensors 130 on a lower substrate (i.e., the first substrate 110) of the LCD panel 200, thereby improving optical characteristics of the LCD, improving its manufacturing cost, and providing a thin LCD. Further, it is precisely determined whether a touch occurs and whether a multi-touch occurs through the capacitance type using the transparent electrode layer 170 formed on the front face of the LCD panel 200, thereby improving operational reliability of the LCD with the built-in touch screen.

Figure 3:
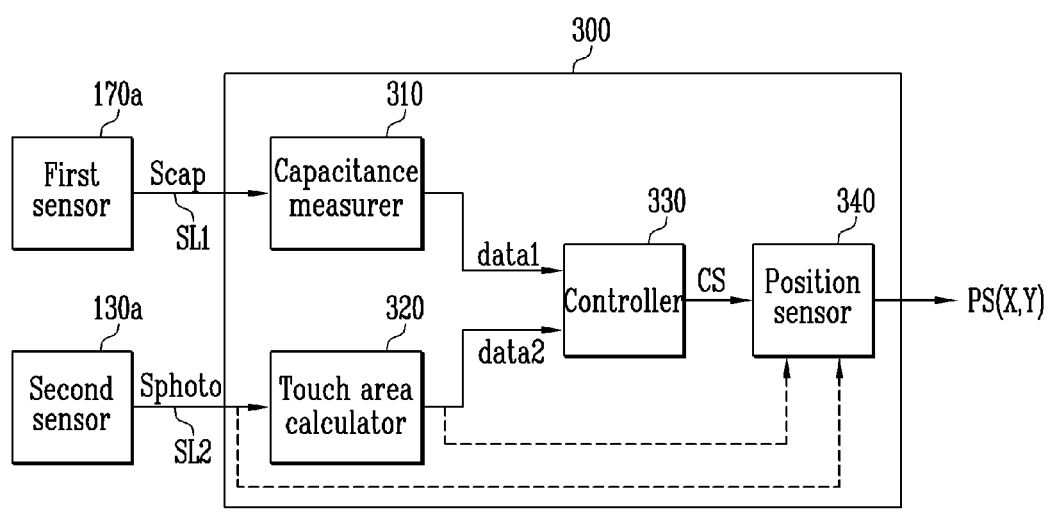
FIG. 3 is a block diagram illustrating a touch screen driver circuit according to an embodiment of the present invention.

FIG. 3 is a block diagram illustrating a touch screen driver circuit 300 according to an embodiment of the present invention. Referring to FIG. 3, when an object 210 is in contact with an LCD panel 200, the touch screen driver circuit 300 senses a capacitance variation Scap through a first sensing line SL1 connected to a transparent electrode layer 170, and outputs position information PS (X,Y) of the contact object 210 by calculating a touch area using optical information Sphoto sensed through a second sensing line SL2 connected to photosensors 130. The touch screen driver circuit 300 determines whether a touch occurs and whether a multi-touch occurs using the capacitance variation Scap and the touch area.

Here, if the capacitance variation Scap is greater than or equal to a predetermined threshold value, the touch screen driver circuit 300 outputs the position information PS (X,Y) of the object 210, sensed by using the optical information Sphoto sensed through a second sensing line SL2 connected to photosensors 130. That is, the occurrence of the touch is determined with reference to the capacitance variation Scap.

When it is determined that a touch occurs (i.e., when the capacitance variation Scap is greater than or equal to a predetermined threshold value), the touch screen driver circuit 300 calculates a touch area through the optical information Sphoto sensed by the photosensors 130 and additionally determines whether a multi-touch occurs based on the calculated touch area. In particular, the touch screen driver circuit 300 determines whether a multi-touch occurs by comparing the capacitance variation Scap with the touch area. For example, if the capacitance variation Scap is not included in a multi-touch range even though the touch area calculated through the optical information Sphoto is a sufficiently large area to a degree in which the touch area is included in the multi-touch range, the touch screen driver circuit 300 determines the touch as a single touch and outputs position information PS (X,Y) for a single point.

That is, if the capacitance variation Scap is measured to be less than the multi-touch range while being greater than or equal to the predetermined threshold value and the touch area and touch point determined using the optical sensed Sphoto is included in the multi-touch range, the touch screen driver circuit 300 selects only one of the sensed touch points. At this time, the reference to select a point may be set as a point at which the touch area is broader than the other points, though it is understood that aspects of the present invention are not limited thereto. For example, according to other aspects, the reference to select a point may be set as a point at which the capacitance variation is greater than the other points, or the like.

Meanwhile, although a multi-touch occurs, only some of the touch points sensed using the optical information Sphoto may be practical touch points. In this case, the reference values for the capacitance variation Scap are predetermined as a plurality of ranges depending on the number of touch points, and some of the touch points are selected, thereby reducing a recognition error in the occurrence of the multi-touch. For example, when three touch points are sensed using the optical information Sphoto but the number of touch points is sensed based on the capacitance variation Scap, the touch screen driver circuit 300 selects two of the three touch points based on a touch area or light quantity variation and outputs position information PS (X,Y) on the selected two touch points, thereby improving operational reliability.

To perform an operation as described above, the touch screen driver circuit 300 includes a capacitance measurer 310, a touch area calculator 320, a controller 330, and a position sensor 340.

The capacitance measurer 310 measures a capacitance variation Scap provided through the first sensing line SL1 and outputs a first data data1 containing information on the measured value to the controller 330. Here, a first sensor 170a connected to the first sensing line SL1 is used to sense a capacitance variation generated by a touch. For example, the first sensor 170a may be implemented as the transparent electrode layer 170 illustrated in FIG. 2.

The touch area calculator 320 calculates a touch area using the optical information Sphoto provided through the second sensing line SL2 and outputs a second data data2 containing information on the touch area to the controller 330. Here, a second sensor 130a connected to the second sensing line SL2 is used to sense the contact position of an object 210. For example, the second sensor 130a may be implemented as the photosensor 130 illustrated in FIG. 2. The optical information Sphoto provided through the second sensing line SL2 may be contained in the second data data2 together with the touch area.

The controller 330 determines whether a touch occurs and whether a multi-touch occurs using the capacitance variation Scap contained in the first data data1 and the touch area contained in the second data data2. The controller 330 outputs a control signal CS to the position sensor 340 based on the determination. For example, if the capacitance variation Scap is greater than or equal to a predetermined threshold value, the controller 330 may determine that a touch occurs.

When it is determined that a touch occurs, the controller 330 may additionally determine whether a multi-touch occurs by comparing the capacitance variation Scap with the touch area. For example, when the capacitance variation Scap is less than the multi-touch range while being greater than or equal to the predetermined threshold value, or the touch area is included in the multi-touch range, the controller 330 may determine the touch as a single touch and accordingly output a control signal CS to the position sensor 340. In this case, the position sensor 340 outputs only the position information P (X,Y) at the selected single point. Here, the control signal CS may include whether a touch occurs, whether a multi-touch occurs, and the optical information Sphoto.

The position sensor 340 outputs the coordinate value for the touch position of an object 210 (i.e., the position information P(X,Y) of the object 210) sensed in response to the control signal CS. Meanwhile, the control signal CS provided from the controller 330 to the position sensor 340 may only include whether a touch occurs and whether a multi-touch occurs. In this case, the position sensor 340 may sense position information P (X,Y) using the optical information Sphoto provided through the second sensing line SL2 or the second data data2 provided from the touch area calculator 320. At this time, the controller 330 may control only the position information P (X,Y) at a position at which the position sensor 340 determines that an object 210 is practically in contact with an LCD panel to be outputted in response to the control signal CS.

As described above, according to aspects of the present invention, the touch screen driver circuit 300 precisely determines whether a touch occurs and whether a multi-touch occurs based on the capacitance variation Scap measured using the transparent electrode layer 170 of FIG. 2 and the touch point and touch area measured using the photosensors 130, thereby providing reliable position information P(X,Y).

Although a few embodiments of the present invention have been shown and described, it would be appreciated by those skilled in the art that changes may be made in this embodi-

What is claimed is:

1. A liquid crystal display (LCD) with a built-in touch screen and an LCD panel, the LCD comprising:
a first substrate comprising a pixel area having a plurality of pixels to display an image, and a sensor area adjacent to the pixel area and having a plurality of photosensors to sense a position of a contact object;
a second substrate positioned over the first substrate, the second substrate comprising a color filter in an area corresponding to the pixel area on a first surface of the second substrate facing the first substrate, a light receiving portion, onto which external light is incident, in an area of the first surface corresponding to the sensor area, and a transparent electrode layer and a front polarizing plate sequentially stacked on a second surface of the second substrate opposite to the first surface;
a liquid crystal layer interposed between the first and second substrates; and
a touch screen driver circuit to measure a capacitance variation of a first capacitance between the contact object and the transparent electrode layer and a second capacitance between the transparent electrode layer and the first substrate sensed through a first sensing line connected to the transparent electrode layer and to calculate a touch area using optical information sensed through a second sensing line connected to the plurality of photosensors when the contact object is in contact with the LCD panel, and to output position information of the contact object, sensed by determining whether a touch of the contact object on the LCD panel occurs and whether a multi-touch occurs using the measured capacitance variation and the calculated touch area.

2. The LCD as claimed in claim 1, wherein the touch screen driver circuit determines that the touch occurs and outputs the position information of the contact object, sensed using the optical information, when the measured capacitance variation is greater than or equal to a predetermined threshold value.

3. The LCD as claimed in claim 1, wherein, when the calculated touch area includes a plurality of touch points sensed using the optical information, the touch screen driver circuit determines that the multi-touch occurs and outputs the position information of the contact object by selecting some of the sensed touch points when the measured capacitance variation is greater than or equal to a predetermined threshold value and within a multi-touch range and the calculated touch area and the plurality of touch points is included in the multi-touch range.

4. The LCD as claimed in claim 3, wherein the touch screen driver circuit selects the some of the plurality of touch points based on the touch area and/or a light quantity variation.

5. The LCD as claimed in claim 3, wherein the touch screen driver circuit determines a number of sensed touch points to select by comparing the measured capacitance variation to a plurality of multi-touch ranges respectively corresponding to a plurality of numbers of touch points such that the determined number corresponds to the multi-touch range, of the plurality of multi-touch ranges, within which the measured capacitance variation lies.

6. The LCD as claimed in claim 1, wherein the touch screen driver circuit comprises:
a capacitance measurer to measure the capacitance variation provided through the first sensing line;
a touch area calculator to calculate the touch area sensed using the optical information provided through the second sensing line;
a controller to control a control signal to be output by determining whether the touch occurs and whether the multi-touch occurs using the capacitance variation and the touch area; and
a position sensor to output the position information of the contact object according to the control signal received from the controller.

7. The LCD as claimed in claim 6, wherein, when the measured capacitance variation is less than a multi-touch range and greater than or equal to a predetermined threshold value, the controller determines the touch occurs as a single touch and outputs the control signal accordingly.

8. The LCD as claimed in claim 7, wherein the position sensor outputs the position information of the contact object as a single point in response to the control signal when the measured capacitance variation is less than the multi-touch range and greater than or equal to the predetermined threshold value.

9. The LCD as claimed in claim 6, wherein the control signal received by the position sensor includes the optical information, used by the position sensor to determine the position information.

10. The LCD as claimed in claim 6, wherein the position sensor receives the optical information, used by the position sensor to determine the position information, from the touch area calculator.

11. The LCD as claimed in claim 6, wherein the position sensor receives the optical information, used by the position sensor to determine the position information, from the second sensing line.

12. The LCD as claimed in claim 1, further comprising:
a backlight assembly positioned below the LCD panel to provide light to the LCD panel,
wherein a light shielding layer to prevent the provided light from being incident directly onto the plurality of photosensors is provided on a surface of the first substrate corresponding to the sensor area.

13. The LCD as claimed in claim 1, wherein, when the calculated touch area includes a plurality of touch points sensed using the optical information, the touch screen driver circuit determines the touch occurs as a single touch and outputs the position information of the contact object by selecting one of the sensed touch points when the measured capacitance variation is greater than or equal to a predetermined threshold value and less than a multi-touch range.

14. The LCD panel as claimed in claim 13, wherein the touch screen driver circuit selects the one sensed touch point that is broader than other sensed touch points in the touch area.

15. The LCD panel as claimed in claim 13, wherein the touch screen driver circuit selects the one sensed touch point that has a greater capacitance variation than other sensed touch points in the touch area.

16. A liquid crystal display (LCD) with a built-in touch screen and an LCD panel, the LCD comprising:
a first substrate comprising a pixel area having a plurality of pixels to display an image, and a sensor area adjacent to the pixel area and having a plurality of photosensors to sense a position of a contact object;
a second substrate positioned over the first substrate, the second substrate comprising a transparent electrode layer;
a liquid crystal layer interposed between the first and second substrates; and a touch screen driver circuit to measure a capacitance variation of a first capacitance between the contact object and the transparent electrode layer and a second capacitance between the transparent electrode layer and the first substrate sensed through a first sensing line connected to the transparent electrode layer and to calculate a touch area using optical information sensed through a second sensing line connected to the plurality of photosensors when the contact object is in contact with the LCD panel, and to output position information of the contact object, sensed by determining whether a touch of the contact object on the LCD panel occurs and whether a multi-touch occurs using the measured capacitance variation and the calculated touch area.

17. The LCD as claimed in claim 16, wherein the touch screen driver circuit determines that the touch occurs and outputs the position information of the contact object, sensed using the optical information, when the measured capacitance variation is greater than or equal to a predetermined threshold value.

18. The LCD as claimed in claim 16, wherein, when the calculated touch area includes a plurality of touch points sensed using the optical information, the touch screen driver circuit determines that the multi-touch occurs and outputs the position information of the contact object as the plurality of touch points when the measured capacitance variation is greater than or equal to a predetermined threshold value.

19. The LCD as claimed in claim 16, wherein, when the calculated touch area includes a plurality of touch points sensed using the optical information, the touch screen driver circuit determines the touch occurs as a single touch and outputs the position information of the contact object by selecting one of the sensed touch points when the measured capacitance variation is greater than or equal to a predetermined threshold value and less than a multi-touch range.

20. A touch screen driver circuit of a liquid crystal display (LCD) with an LCD panel comprising a first substrate and a second substrate with a liquid crystal layer interposed therebetween, a plurality of photosensors on the first substrate to sense a position of a contact object in contact with the LCD panel, and a transparent electrode layer on the second substrate, the touch screen driver circuit comprising:
  a capacitance measurer to measure a capacitance variation of a first capacitance between the contact object and the transparent electrode layer and a second capacitance between the transparent electrode layer and the first substrate provided through a first sensing line connected to the transparent electrode layer;
  a touch area calculator to calculate a touch area using optical information provided through a second sensing line connected to the plurality of photosensors when the contact object is in contact with the LCD panel;
  a controller to control a control signal to be output by determining whether a touch occurs and whether a multi-touch occurs using the measured capacitance variation and the calculated touch area; and
  a position sensor to output position information of the contact object according to the control signal received from the controller.

21. The touch screen driver circuit as claimed in claim 20, wherein the controller determines that the touch occurs and the position sensor outputs the position information of the contact object, sensed using the optical information, when the measured capacitance variation is greater than or equal to a predetermined threshold value.

22. The touch screen driver circuit as claimed in claim 20, wherein, when the calculated touch area includes a plurality of touch points sensed using the optical information, the controller determines that the multi-touch occurs and the position sensor outputs the position information of the contact object as the plurality of touch points when the measured capacitance variation is greater than or equal to a predetermined threshold value.

23. The touch screen driver circuit as claimed in claim 20, wherein, when the calculated touch area includes a plurality of touch points sensed using the optical information, the controller determines the touch occurs as a single touch and the position sensor outputs the position information of the contact object by selecting one of the sensed touch points when the measured capacitance variation is greater than or equal to a predetermined threshold value and less than a multi-touch range.

24. The touch screen driver circuit as claimed in claim 20, wherein the control signal received by the position sensor includes the optical information, used by the position sensor to determine the position information.

25. The touch screen driver circuit as claimed in claim 20, wherein the position sensor receives the optical information, used by the position sensor to determine the position information, from the touch area calculator.

26. The touch screen driver circuit as claimed in claim 20, wherein the position sensor receives the optical information, used by the position sensor to determine the position information, from the second sensing line.

* * * * *